United States Patent
Suganuma

(10) Patent No.: US 10,275,228 B2
(45) Date of Patent: Apr. 30, 2019

(54) RELAXING USER-SPECIFIED REGISTER CONSTRAINTS FOR IMPROVING REGISTER ALLOCATION

(71) Applicant: INTERNATIONAL BUSINESS MACHINES CORPORATION, Armonk, NY (US)

(72) Inventor: Toshio Suganuma, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 15/084,110

(22) Filed: Mar. 29, 2016

(65) Prior Publication Data

US 2017/0286078 A1 Oct. 5, 2017

(51) Int. Cl.
*G06F 21/55* (2013.01)
*G06F 9/30* (2018.01)
*G06F 8/41* (2018.01)

(52) U.S. Cl.
CPC ............ *G06F 8/441* (2013.01); *G06F 8/443* (2013.01)

(58) Field of Classification Search
CPC ...................................... G06F 8/441
USPC ......................................... 717/151
See application file for complete search history.

(56) References Cited

U.S. PATENT DOCUMENTS

| | | | |
|---|---|---|---|
| 5,339,428 A | 8/1994 | Burmeister et al. | |
| 7,681,187 B2 | 3/2010 | Ludwig et al. | |
| 9,009,692 B2 | 4/2015 | Kalogeropulos et al. | |
| 2002/0196678 A1* | 12/2002 | Haber | G06F 9/4486 365/200 |
| 2010/0165765 A1* | 7/2010 | Yu | G11C 13/0004 365/200 |
| 2013/0086598 A1* | 4/2013 | Gschwind | G06F 9/3832 719/330 |
| 2016/0092222 A1* | 3/2016 | Keppel | G06F 9/30185 712/228 |
| 2017/0140148 A1* | 5/2017 | Gleeson | G06F 21/125 |

* cited by examiner

*Primary Examiner* — Li B. Zhen
*Assistant Examiner* — Mohammad H Kabir
(74) *Attorney, Agent, or Firm* — Tutunjian & Bitetto, P.C.; Vazken Alexanian

(57) ABSTRACT

A method is provided for relaxing register constraints in a computer program. The method includes identifying, by a processor enabled compiler, unrequired register constraints imposed by a user on the computer program. The unrequired register constraints are unrequired for a proper operation of the computer program. The method further includes automatically relaxing, by the processor enabled compiler, the identified unrequired register constraints to optimize register allocation for the computer program.

16 Claims, 12 Drawing Sheets

RELAXING USER-SPECIFIED REGISTER CONSTRAINTS FOR IMPROVING REGISTER ALLOCATION

BACKGROUND

Technical Field

The present invention relates generally to computing devices and, in particular, to relaxing user-specified register constraints for improving register allocation.

Description of the Related Art

Languages such as C/C++ and PL/X allow programmers to write direct register assignment and manipulation using a REGISTER (or REG) attribute and inline assembly.

For example, in C/C++, a variable with REGISTER attribute and asm ("reg") indicates that the variable gets the specified register assigned throughout its lifetime. We call such a variable a restricted register (or "RR" in short) variable.

Similarly in PL/X, a REG(N) attribute for a variable represents that the variable holds a general purpose register N. Also, a variable with a REG(*) attribute gets a general purpose register (other than registers @00, @01, @13-@15) allocated throughout its lifetime and should never be spilled into the local memory. This is called a designated register (or "DR" in short) variable.

In such cases, programmers are assumed to take complete responsibility for register management of RR variables (including where to actually restrict/unrestrict in PL/X). The register is made unavailable to the compiler in program regions where a RR variable is actually restricted or live (that is, in use).

These RR and DR variables are typically used in conjunction with inline assembly code. Also, in C/C++, users are allowed to specify an input and output interface to an inline assembly block with specific register assignments. This is another form of a RR variable, although the register requirement is in effect only in the scope of the inline assembly block.

However, such register requirements constrain the freedom of compiler optimizations and can lead to poor performance due to inefficient register usage.

For example, in C/C++, simply specifying the REGISTER keyword only tells the compiler to store the variable onto a register, if possible. It is not a mandate requirement, just a hint to the compiler. RR variables are different from such a case.

The compiler has to strictly follow the register requirements of RR, since these variables are often used with other code of direct register manipulation (that is, inline assembly). However, this results in the compiler generating code with poor performance, since some registers are out of control for compiler optimizations over program regions.

For RR variables, programmers do not necessarily choose the best registers, leading to inflexible register usage and causing unnecessary spills. Also in PL/X, RR variables are often over-restricted due to an explicit restrict/unrestrict control that is required. In an extreme case, an RR variable is restricted but never unrestricted, causing one less register to be used/available in/for the procedure for register allocator.

For DR variables, the compiler can allocate registers but not all registers are allowed to be used for such allocation. This is because PL/X inline assembly (GENERATE statements) may include a system call, which typically destroys those registers implicitly. However, this specification is over-restrictive for some DR variables.

SUMMARY

According to an aspect of the present principles, a method is provided for relaxing register constraints in a computer program. The method includes identifying, by a processor enabled compiler, unrequired register constraints imposed by a user on the computer program. The unrequired register constraints are unrequired for a proper operation of the computer program. The method further includes automatically relaxing, by the processor enabled compiler, the identified unrequired register constraints to optimize register allocation for the computer program.

According to another aspect of the present principles, a computer program product is provided for relaxing register constraints in a computer program. The computer program product includes a non-transitory computer readable storage medium having program instructions embodied therewith. The program instructions are executable by a computer to cause the computer to perform a method. The method includes identifying, by a processor enabled compiler, unrequired register constraints imposed by a user on the computer program. The unrequired register constraints are unrequired for a proper operation of the computer program. The method further includes automatically relaxing, by the processor enabled compiler, the identified unrequired register constraints to optimize register allocation for the computer program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to relaxing user-specified register constraints for improving register allocation. As used herein, "RR" denotes a restricted register, and "DR" denotes a designated register. Moreover, the term "unrequired register constraints" denotes constraints on registers that are user-specified/imposed and that are not required for proper program operation, while the term "required register constraints" denotes constraints on registers that are required for proper program operation (i.e., that must be adhered to in order to get the desired and expected correct result). Further, as used herein, the terms "relax" and "relaxation" in reference to register constraints refers to lessening or completely removing the register constraints for a given variable.

In consideration of the fact that some RR/DR variables are over-restricted, that is, do not necessarily have to be restricted to specific registers, the present principles provides an approach for relaxing the register requirements for such variables. In an embodiment, the present principles involve identifying which variables can be safely relaxed by program analysis, and applying appropriate transformation. This allows the compiler to get more discretions of register control and to generate better code.

Figure 1:
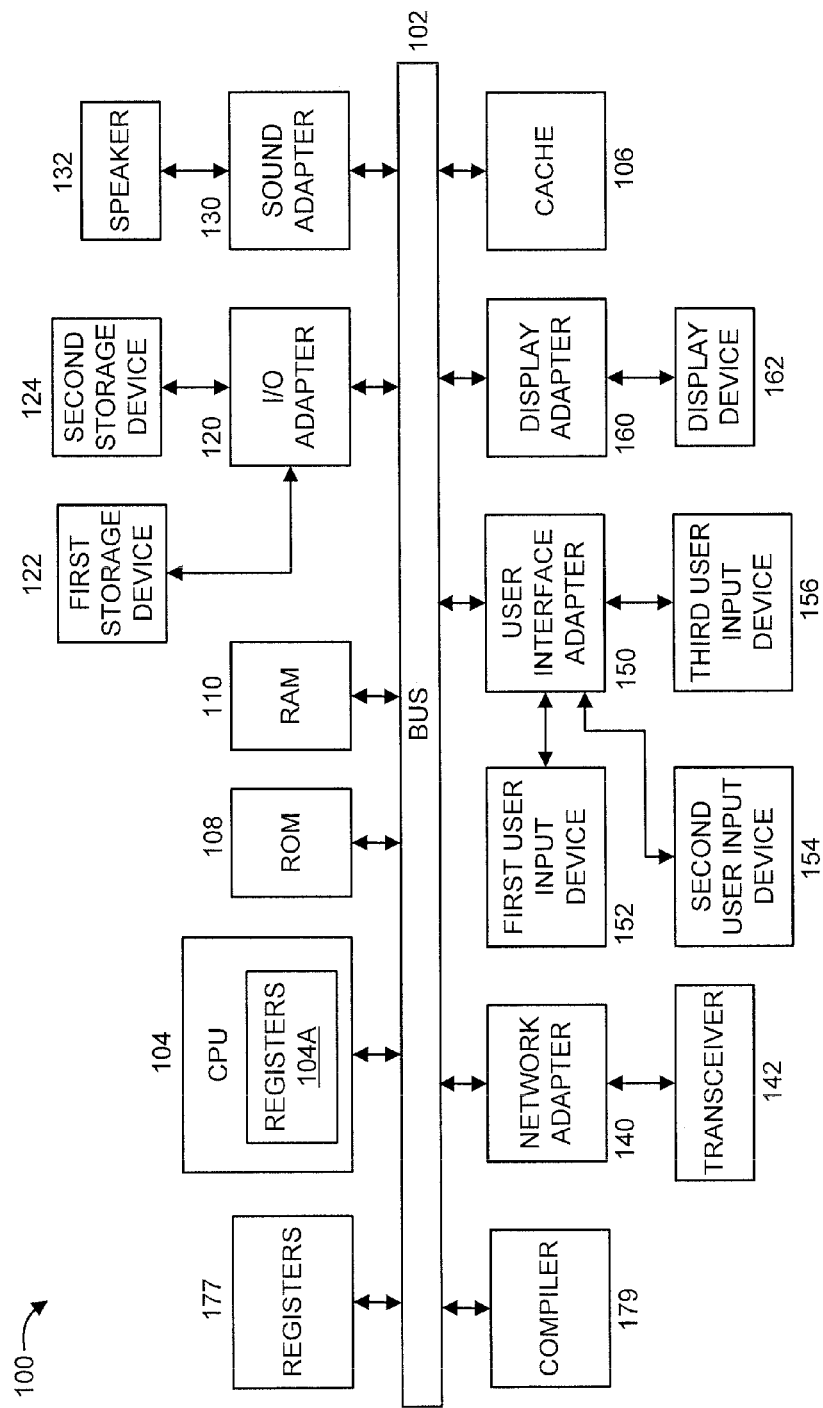
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. The CPU 104 includes a set of registers 104A. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A set of hardware registers 177 is operatively coupled to system bus 102. A compiler 179 is operatively coupled to system bus 102.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the processing system 100 are readily contemplated by one of ordinary skill in the art given the teachings of the present principles provided herein.

Figure 2:
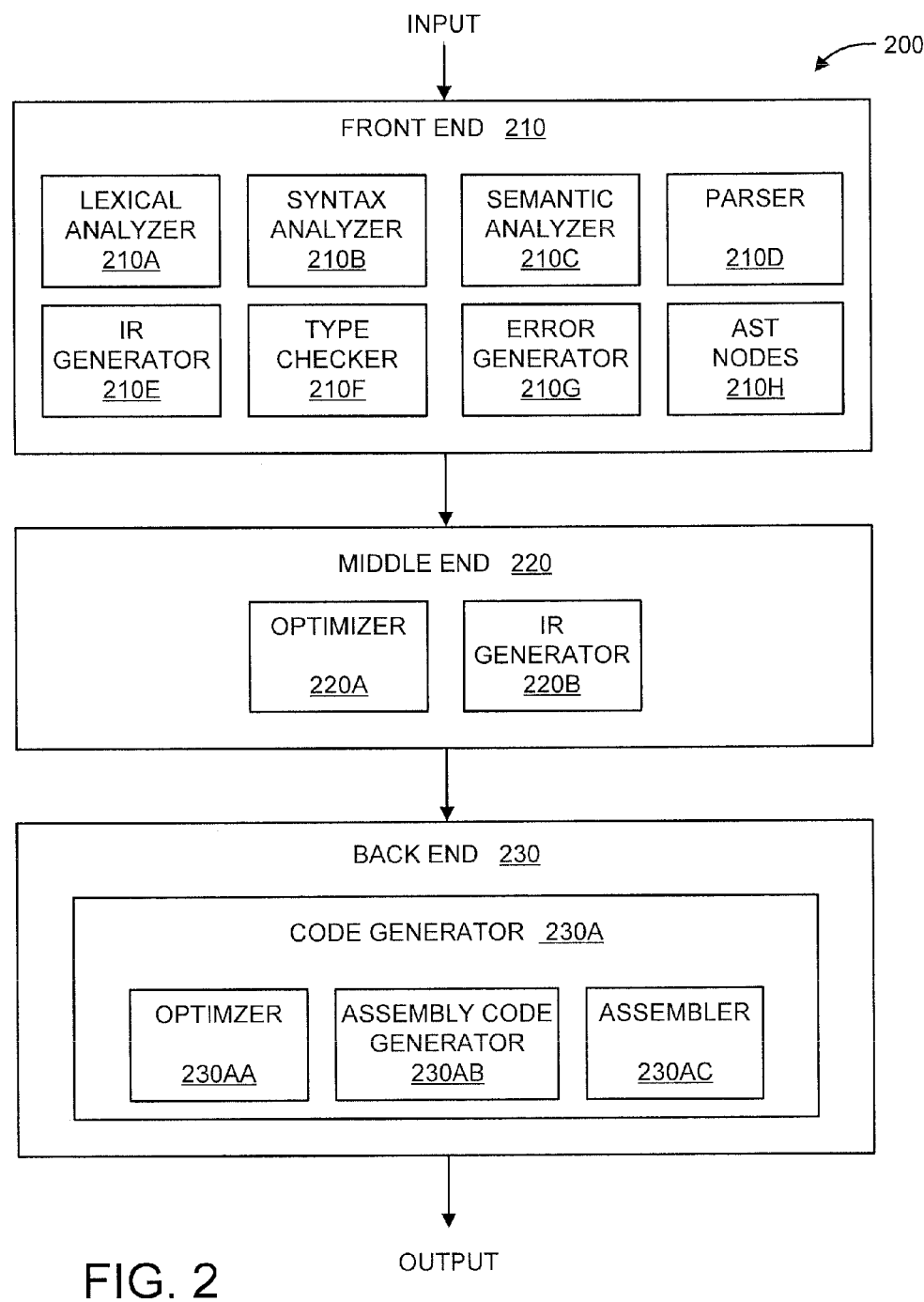
FIG. 2 shows an exemplary compiler 200, in accordance with an embodiment of the present principles.

Moreover, it is to be appreciated that compiler 200 described below with respect to FIG. 2 is a compiler for implementing respective embodiments of the present principles. Part or all of processing system 100 may be implemented in one or more of the elements of compiler 200.

Figure 4:
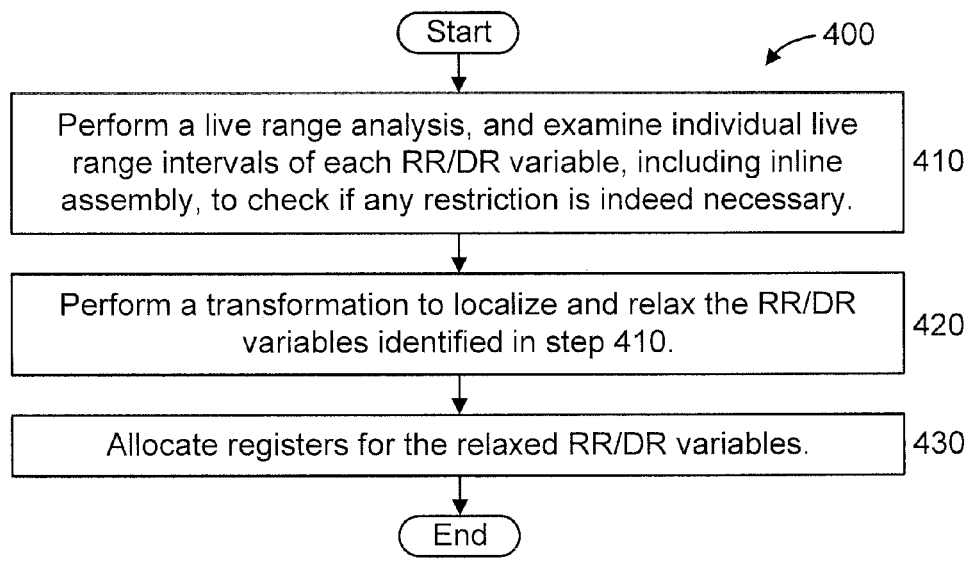
FIG. 4 shows an exemplary method 400 for relaxing and optimizing register requirements in a computing device having multiple registers, in accordance with an embodiment of the present principles.
Figure 5:
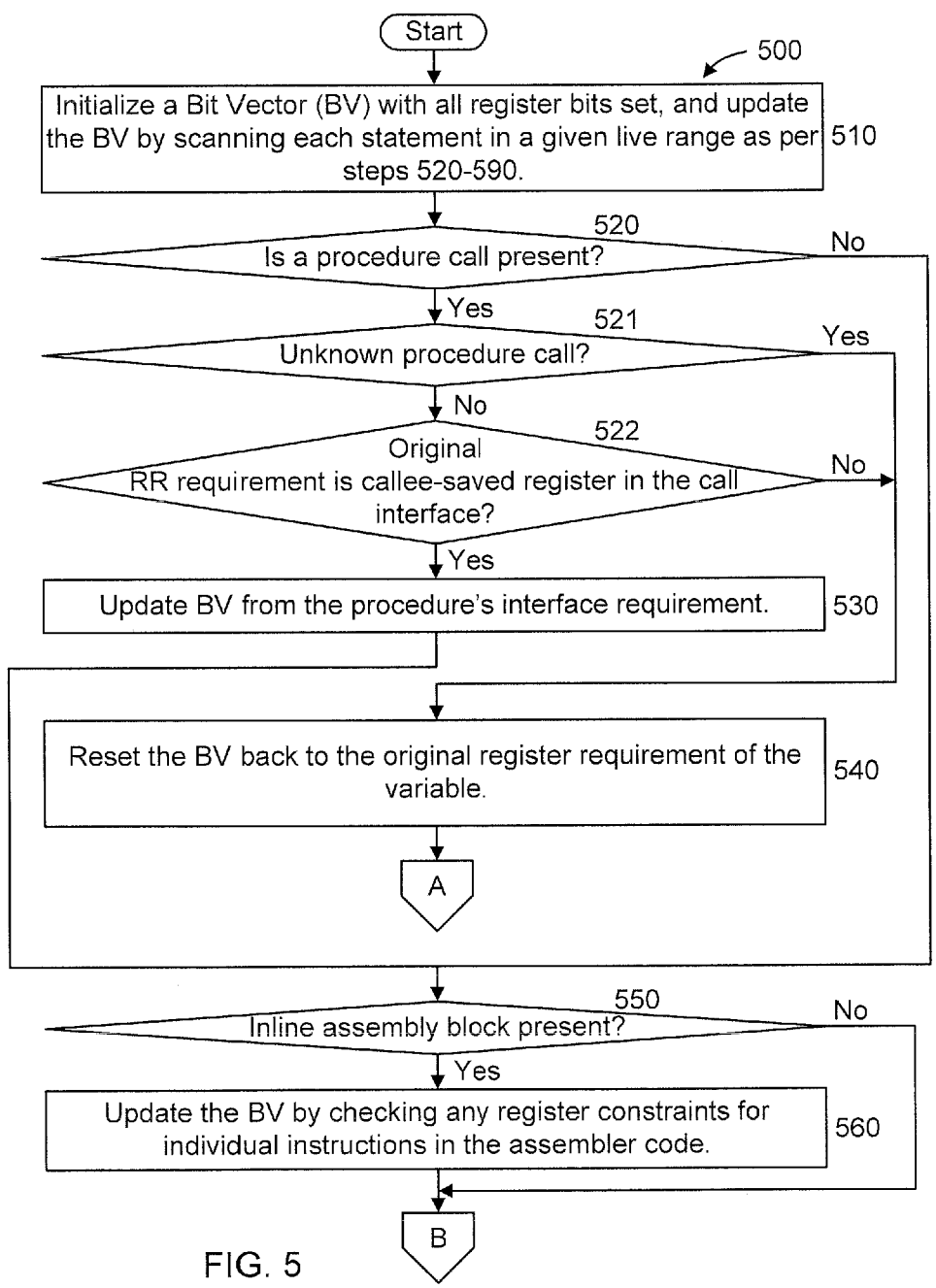
FIGS. 5-6 further show step 410 of FIG. 4, in accordance with an embodiment of the present principles.
Figure 6:
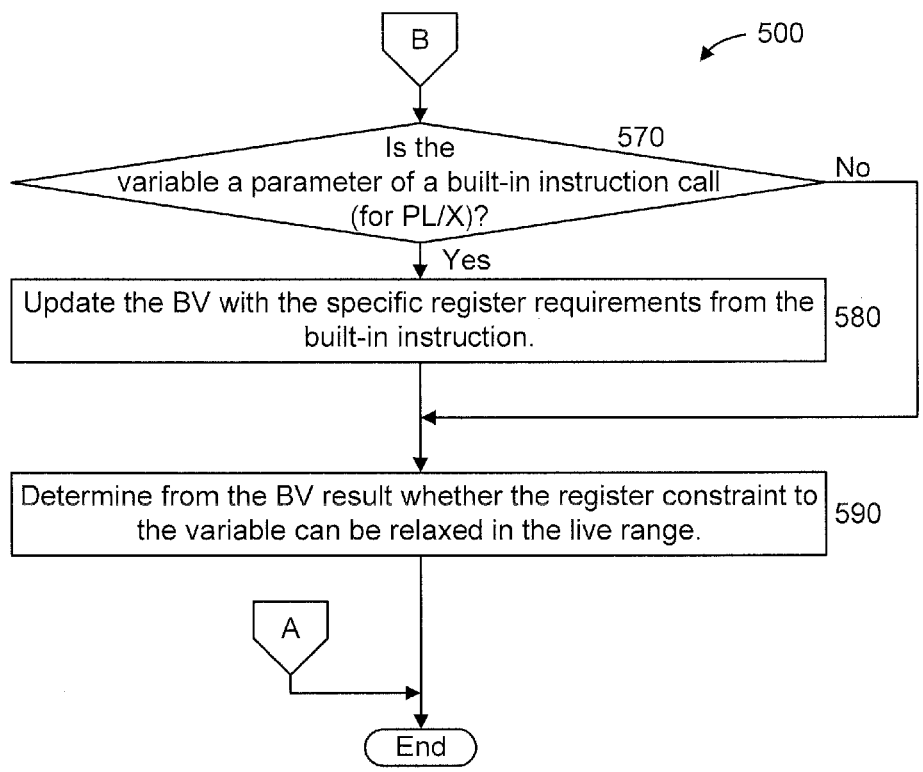
Figure 7:
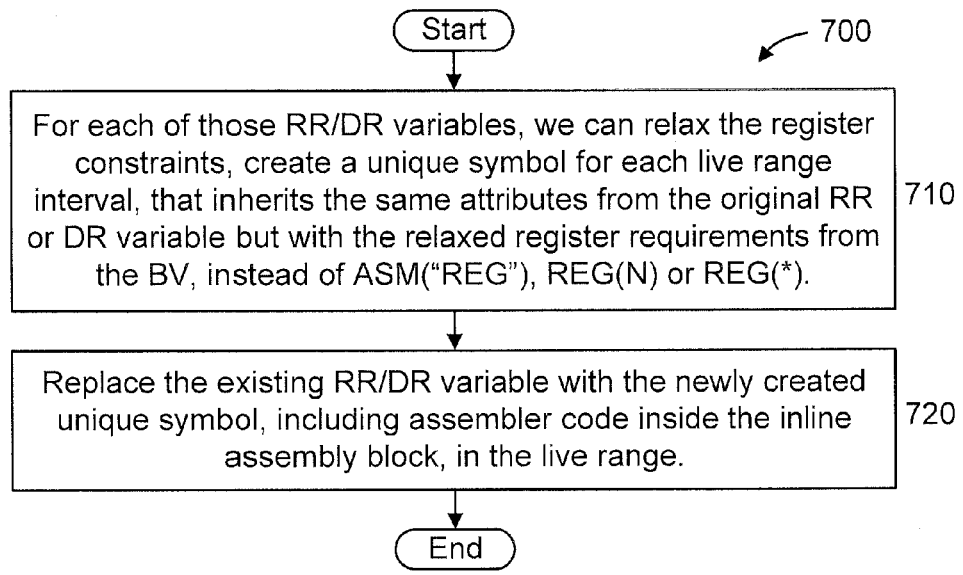
FIG. 7 further shows step 420 of FIG. 4, in accordance with an embodiment of the present principles.
Figure 8:
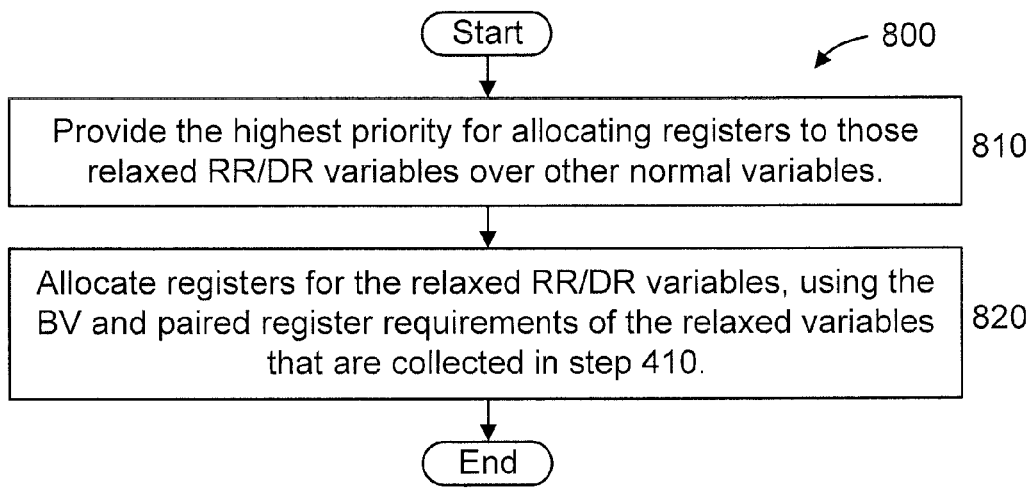
FIG. 8 further shows step 430 of FIG. 4, in accordance with an embodiment of the present principles.
Figure 9:
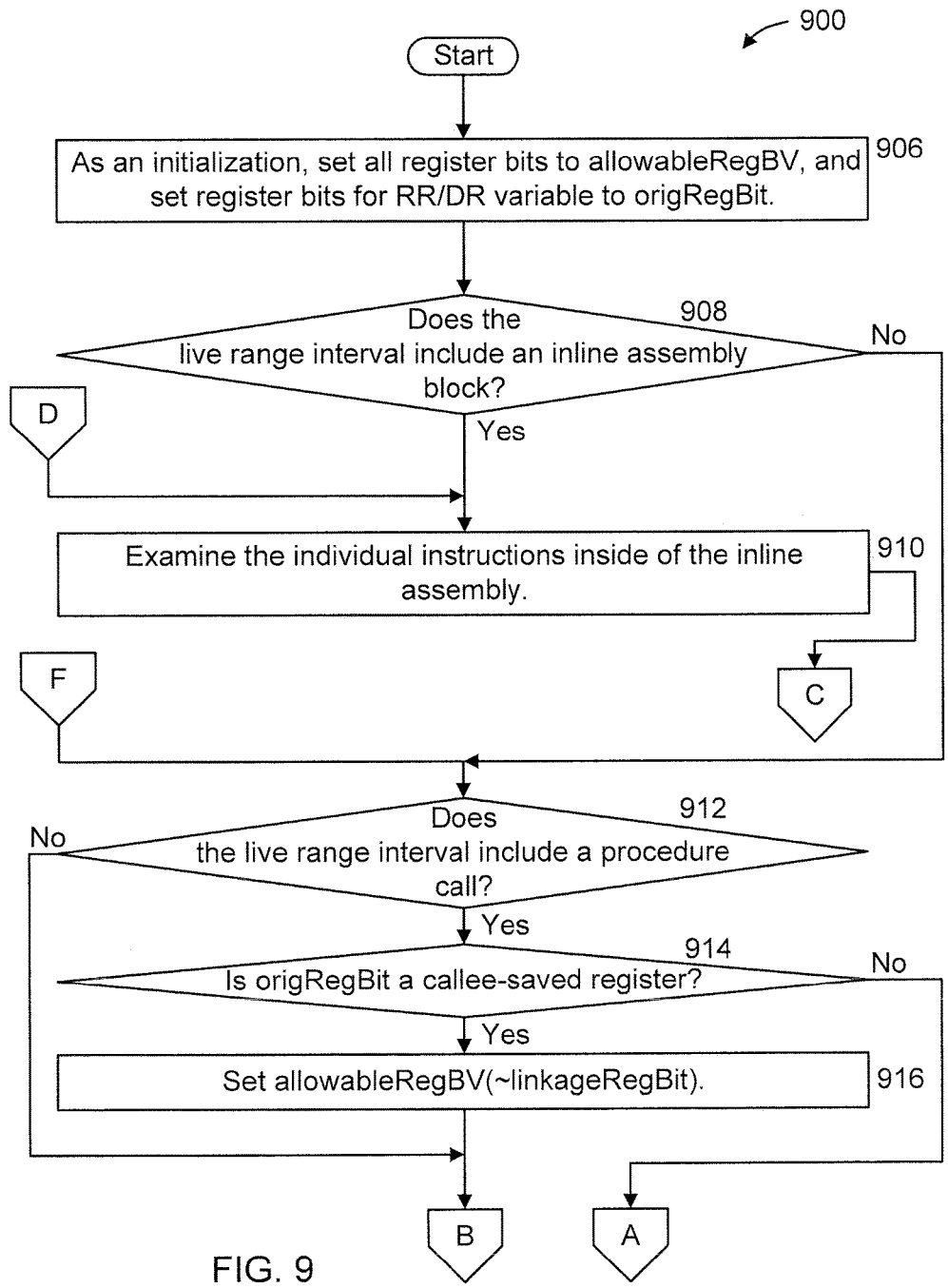
FIGS. 9-12 show another exemplary method 900 for register relaxation, in accordance with an embodiment of the present principles.
Figure 10:
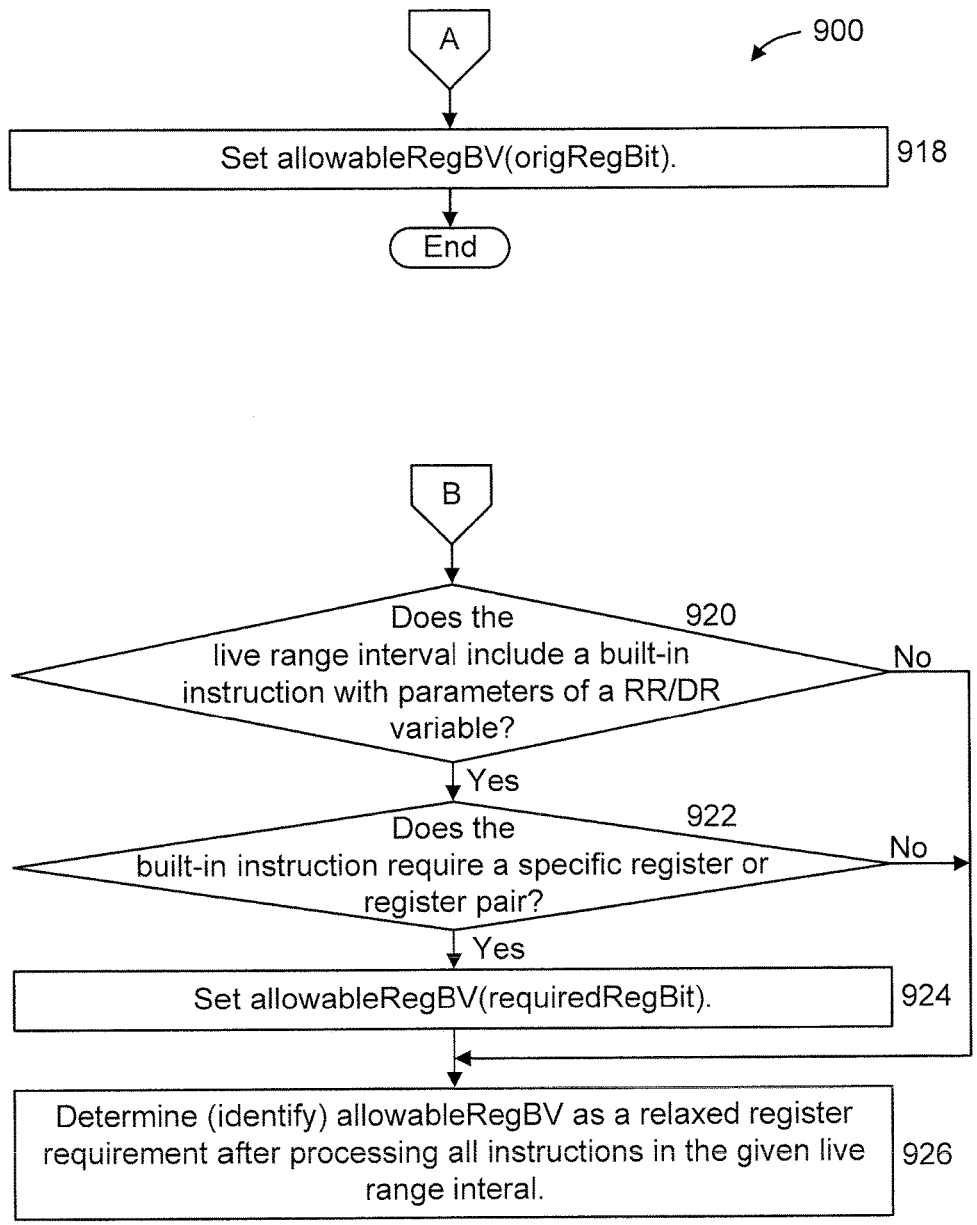
Figure 11:
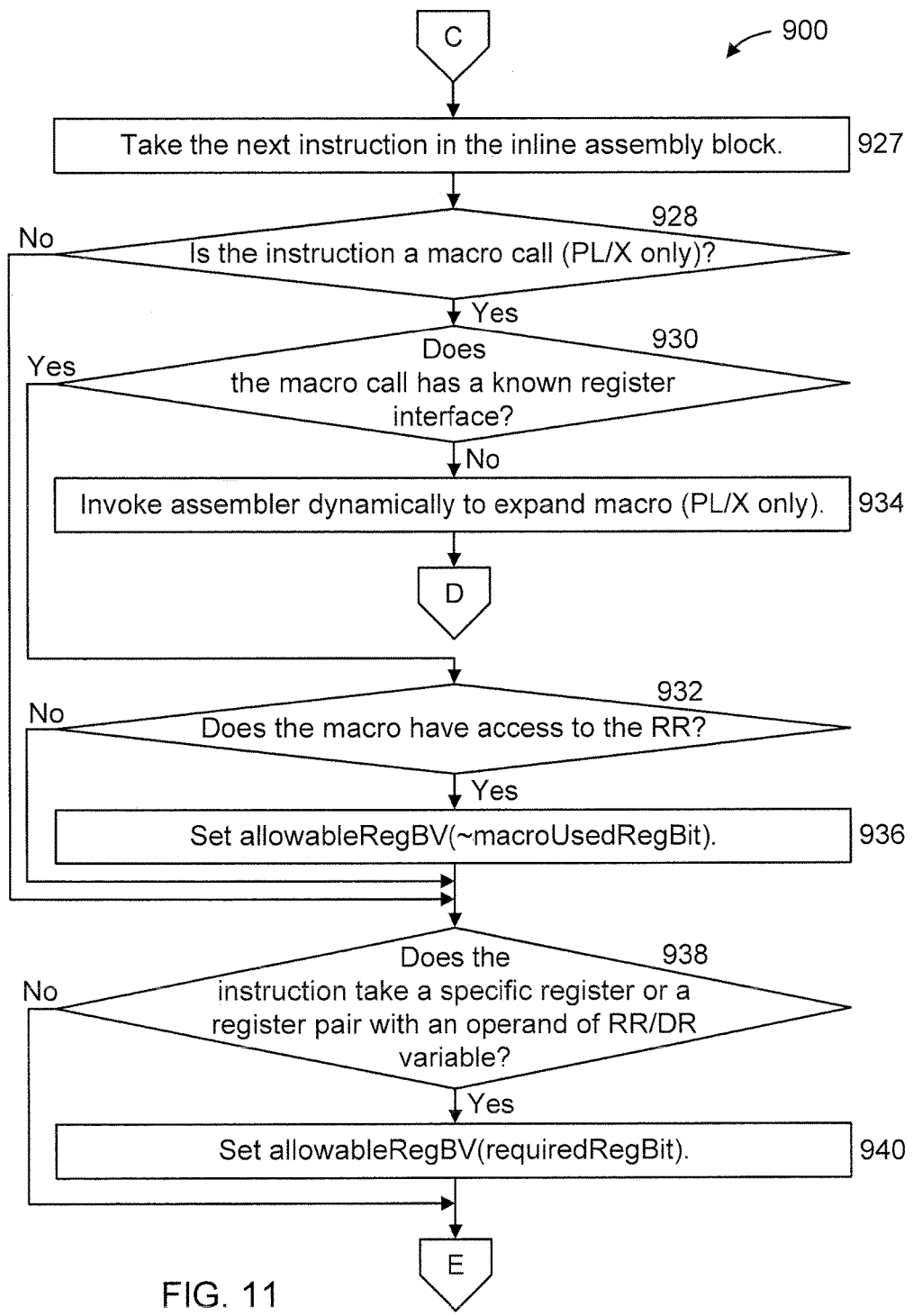
Figure 12:
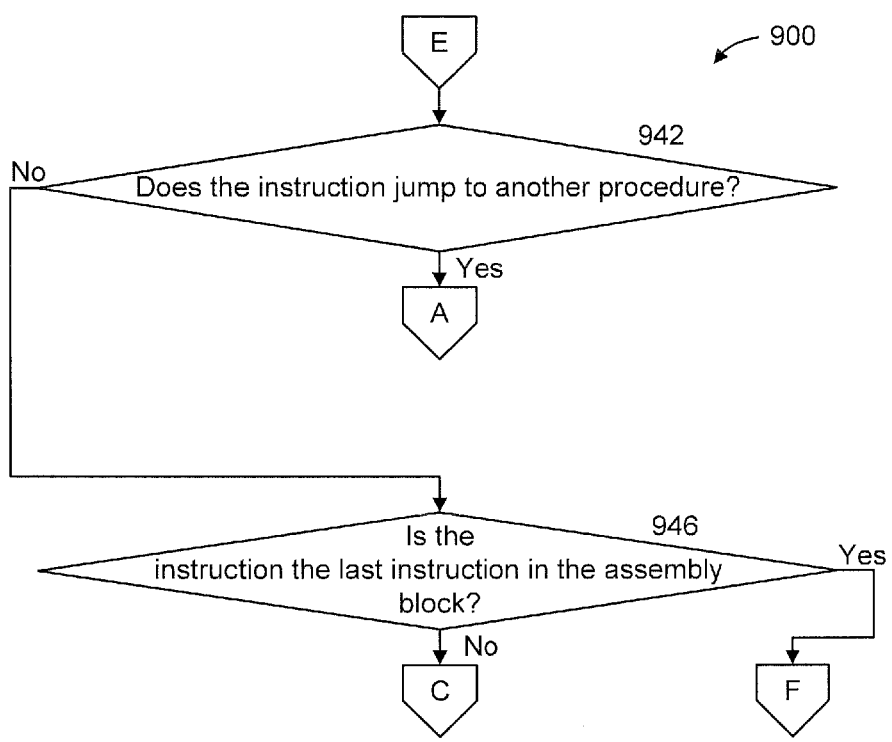

Further, it is to be appreciated that processing system 100 may perform at least part of the method described herein including, for example, at least part of method 400 of FIG. 4 and/or at least part of method 500 of FIGS. 5-6 and/or at least part of method 700 of FIG. 7 and/or at least part of method 800 of FIG. 8 and/or at least part of method 900 of FIGS. 9-12. Similarly, part or all of compiler 200 may be used to perform at least part of method 400 of FIG. 4 and/or at least part of method 500 of FIGS. 5-6 and/or at least part of method 700 of FIG. 7 and/or at least part of method 800 of FIG. 8 and/or at least part of method 900 of FIGS. 9-12.

FIG. 2 shows an exemplary compiler 200, in accordance with an embodiment of the present principles.

The compiler 200 includes one or more front-ends 210, a middle-end 220, and one or more back-ends 230. For the sake of simplicity, only one of the front-ends 210 and only one of the back-ends 230 are shown in FIG. 2.

Each of the front-ends 210 can include a lexical analyzer (also referred to as a scanner) 210A, a syntax analyzer 210B, and a semantic analyzer 210C for respectively performing a lexical analysis, a syntax analysis, and a semantic analysis on input code (e.g., input source code). In an embodiment, the lexical analyzer 210A outputs tokens, the syntax analyzer 210B outputs an abstract syntax tree, and the semantic analyzer 210C outputs a decorated abstract syntax tree. Each of the front-ends 210 can also include a parser 210D for parsing the input code to assist in one or more of the preceding analysis. In other embodiments, the parser 210D is part of one or more of the analyzers (e.g., analyzers 210B and 210C). Each of the front-ends 210 can further include an intermediate representation (IR) generator 210E for generating an IR of the source code for processing by the middle-end 220. The IR is generated based on a result(s) of one or more of the preceding analysis. Each of the front-ends 210 can additionally include a type checker 210F and an error generator 210G for respectively performing type checking and generating errors and warnings. Each of the front-ends 210 can include a set of abstract syntax tree (AST) nodes 210H for storing a tree representation of the abstract syntactic structure of source code written in a programming language.

The middle-end 220 can include an optimizer 220A for performing optimizations on the intermediate representation, and an intermediate representation (IR) generator 220B for generating another intermediate representation for the back-end 230. The optimizations can include, but are not limited to, removing useless code, relocating computations to more advantageous (e.g., less frequently executed) locations (e.g., out-of-loop), computation specialization based on context, and so forth. The intermediate representation generated by the middle-end 220 can be source code/machine code independent to enable optimizations that are shareable between different languages and target processors.

The back-end 230 can include a code generator 230A for generating code. The code can be assembly code or executable code (already assembled). In an embodiment, the code generator 230A can include an optimizer 230AA for performing optimizations (e.g., target platform specific optimization including, but not limited to, register allocation and optimized target code utilization of target platform hardware), an assembly code generator 230AB for generating assembly code, and an assembler 230AC for assembling the assembly code into an executable code. The back-end 230 can generate target code (via code generator 230A) for a particular target platform (e.g., a processor or set of processors and a particular operating system).

Figure 3:
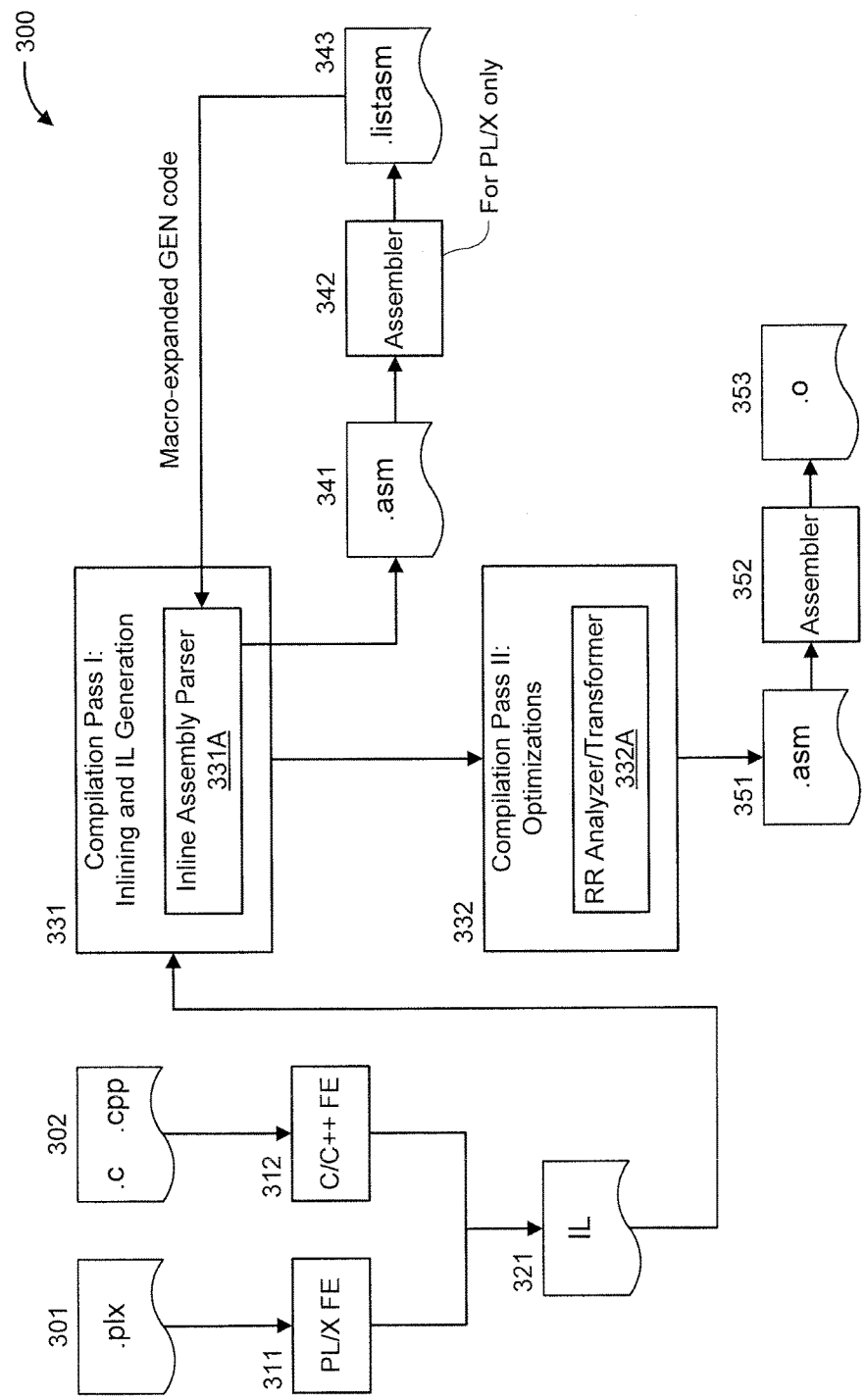
FIG. 3 shows an exemplary compiler framework 300 to which the present principles can be applied, in accordance with an embodiment of the present principles.

FIG. 3 shows an exemplary compiler framework 300 to which the present principles can be applied, in accordance with an embodiment of the present principles.

The compiler framework 300 parses inline assembly blocks (e.g., GEN statements in PL/X) in a separate step to process generic macros effectively. In the embodiment of FIG. 3, the compiler framework 300 includes a PL/X front-end (FE) 311 and a C/C++ front-end 312 for respectively receiving PL/X computer programming code 301 and C/C++ (.c/.cpp) computer programming code 302 to output IL 321.

The compiler framework 300 involves a compilation pass I 331 wherein inlining and corresponding intermediate language (IL) generation are performed, and further involves a compilation pass II 332 wherein optimizations are performed.

In the compilation pass I 331, after inlining and IL generation 331A, an inline assembly parser 331A parses instructions in the inline assembly block to get all register requirements and store the information for the analysis step.

In the compilation pass II 332, an RR analyzer/transformer 332B analyzes the code for RR and transforms the code to relax user-specified register requirements.

For PL/X, the inline assembly blocks (GEN statements) may include Macros. For those macros which we have a priori knowledge, we employ the known interface information for register requirements.

When we encounter a generic macro in the inline assembly block in the assembly code 341, we invoke Assembler 342 dynamically from the compiler to get macro expanded assembler code 343 and send it back to the inline assembly parser 331A. This allows us to get register requirements in PL/X GEN statements more precisely.

After the compilation pass II 332, which includes a set of optimizations, the code generator generates the assembly code 351 for the given program which is then processed by assembler 352 to generate object code 353.

FIG. 4 shows an exemplary method 400 for relaxing and optimizing register requirements in a computing device having multiple registers, in accordance with an embodiment of the present principles.

At step 410, perform a live range analysis, and examine individual live range intervals of each RR/DR variable, including inline assembly, to check if any restriction is indeed necessary. Step 410 is described in further detail herein below with respect to FIGS. 5-6. A live range interval of a RR/DR variable is the lifetime interval during which the RR/DR variable is being used.

At step 420, perform a transformation to localize and relax the RR/DR variables identified in step 410. Step 420 is described in further detail herein below with respect to FIG. 7.

At step 430, allocate registers for the relaxed RR/DR variables. Step 430 is described in further detail herein below with respect to FIG. 8.

FIGS. 5-6 further show step 410 of FIG. 4, in accordance with an embodiment of the present principles. This is an overview of the steps for examining a live range of RR/DR variables. More detailed and fully described steps are shown from FIG. 9 to FIG. 12.

At step 510, initialize a Bit Vector (BV) with all register bits set, and update the BV by scanning each statement in a given live range as per steps 520-590.

At step 520, determine whether there is a procedure call present. If so, then continue to step 521. Otherwise, continue to step 550.

At step 521, determine whether the procedure call is an unknown procedure call. If so, then continue to step 540. Otherwise, continue to step 522.

At step 522, determine whether the original RR requirement is a callee-saved register in the call interface. If so, then continue to step 530. Otherwise, continue to step 540.

At step 530, update BV from the procedure's interface requirement.

At step 540, reset the BV back to the original register requirement of the variable. Since we now know we have to keep the original register requirement, we stop examining further and terminate the method 500.

At step 550, determine whether there is an inline assembly block. If so, then continue to step 560. Otherwise, continue to step 570.

At step 560, update the BV by checking any register constraints for individual instructions in the assembler code.

At step 570, determine if the variable is a parameter of a built-in instruction call (PL/X case). If so, continue to step 580. Otherwise, continue to step 590.

At step 580, update the BV with the specific register requirements from the built-in instruction.

At step 590, determine from the BV result whether the register constraint to the variable can be relaxed in the live range. The BV itself indicates what registers can be used for the RR/DR variables. For example, if all bits are set in the resulting BV, it means the RR/DR variables can be allocated to any registers.

FIG. 7 further shows step 420 of FIG. 4, in accordance with an embodiment of the present principles.

At step 710, for each of those RR/DR variables we can relax the register constraints, create a unique symbol for each live range interval, that inherits the same attributes from the original RR or DR variable but with the relaxed register requirements from the BV, instead of ASM("REG"), REG(N) or REG(*).

At step 720, replace the existing RR/DR variable with the newly created unique symbol, including assembler code inside the inline assembly block, in the live range. If the constraint to RR is specified at inline assembly interface (in C), simply changing the register attribute of RR may be sufficient. For PL/X, remove RR from the relevant RESPECIFY statements before/after the live range interval.

FIG. 8 further shows step 430 of FIG. 4, in accordance with an embodiment of the present principles.

At step 810, provide the highest priority for allocating registers to those relaxed RR/DR variables over other normal variables.

At step 820, allocate registers for the relaxed RR/DR variables, using the BV and paired register requirements of the relaxed variables that are collected in step 410. This is to rely on the normal register allocation process that deals with special register requirements or preferences, where we give allowable register information from the BV.

FIGS. 9-12 show a more detailed exemplary method 900 for register relaxation, in accordance with an embodiment of the present principles. Method 900 fully describes the steps to examine register requirements in a given live range interval for a RR/DR variable in method 410 of FIG. 4.

At step 906, as an initialization, set all register bits to allowableRegBV, and set register bits specified for RR/DR variable to origRegBit. That is, allowableRegBV←all register bits
origRegBit←register bits of RR/DR.

At step 908, determine whether the live range interval includes an inline assembly block. If so, then proceed to step 910. Otherwise, proceed to step 912.

At step 910, examine the individual instructions inside of the inline assembly. Step 910 is further described in FIG. 11 and FIG. 12. That is, steps 927, 928, 930, 932, 934, 936, 938, 940, 942, and 946 are part of step 910.

At step 912, determine whether the live range interval includes a procedure call. If so, then proceed to step 914. Otherwise, proceed to step 920.

At step 914, determine whether origRegBit is a callee-saved register (in PL/X, check proc SAVE/NOSAVE entry option). If so, then proceed to step 916. Otherwise, proceed to step 918. Regarding step 914, see the example described below with respect to TABLE 2.

At step 916, set allowableRegBV(~linkageRegBit). This removes the linkage registers from the allowable register bits in register allocation.

At step 918, set allowableRegBV(origRegBit). This sets the original register requirements as allowable register bits, indicating we give up relaxing register constraints for the RR/DR variable in the current live range. Thus the method is terminated after this step.

At step 920, determine whether the live range interval includes a built-in instruction with parameters of a RR/DR variable. If so, then proceed to step 922. Otherwise, proceed to step 926.

At step 922, determine whether the built-in instruction requires a specific register or a register pair. If so, then proceed to step 924. Otherwise, proceed to step 926. Regarding step 922, see the example described below with respect to TABLE 3.

At step 924, set allowableRegBV(requiredRegBit).

At step 926, determine (identify) allowableRegBV as a relaxed register requirement after processing all instructions in the given live range interval.

At step 927, take the next instruction in the inline assembly block.

At step 928, determine, for a given instruction being currently examined, whether the instruction is a macro call (PL/X only). If so, then proceed to step 930. Otherwise, proceed to step 938.

At step 930, determine whether the macro call has a known register interface. If so, then proceed to step 932. Otherwise, proceed to step 934.

At step 934, invoke assembler dynamically to expand the macro (PL/X only).

At step 932 determine whether the macro call has access to the RR. If so, then proceed to step 936. Otherwise, proceed to step 938.

At step 936, set allowableRegBV(~macroUsedRegBit). This removes all register bits used in the macro from allowable register bits for register allocation.

At step 938, determine whether the instruction currently being examined takes a specific register or a register pair with an operand of RR/DR variable. If so, then proceed to step 940. Otherwise, proceed to step 942.

At step 940, set allowableRegBV(requiredRegBit).

At step 942, determine whether the instruction currently being examined jumps to another procedure. If so, then proceed to step 918. Otherwise, proceed to step 946. Regarding step 942, see the example described below with respect to TABLE 1.

At step 946, determine whether the instruction currently being examined is the last instruction in the assembly block. If not, then go back to step 927 to take the next instruction in the assembly block. Otherwise, return to step 912 to examine the next instruction after the assembly block.

Various examples of the analysis step will now be described, in accordance with various embodiment of the present principles.

A first example, directed to inline assembly code, will now be described with respect to TABLE 1.

TABLE 1

| |
|---|
| DCL SAVER3 FIXED(64); |
| RFY (R1,R2,R3,R14,R15) RSTD; |
| SAVER3 = R3; |
| R15 = MSIKPProc;     ! call target addr |
| R1 = TMP_KEYPTR; |
| R2 = MSISELP; |
| R3 = ADDR(KPPStatD); |
| Generate Code Refs(R1,R2,R3,R15) Sets(R14,R15); |
|    BASR R14,R15     ! branch to routine |
| @EndGen; |
| R3 = SAVER3;     ! restore orig R3 |
| EVAK_RC = R15;     ! return val |
| RFY (R1,R2,R3,R14,R15) UNRSTD; |

RR cannot be relaxed if we find an unknown use of registers, such as a macro call and jump to other procedures.

If there is a branch to another procedure, RR may be used as a register-passing parameter or return value (see TABLE 1), which we cannot identify as safe to relax.

If there is an instruction that takes a paired register, record the information for use in the register allocation step.

A second example, directed to procedure call, will now be described with respect to TABLE 2.

TABLE 2

| |
|---|
| A:PROC; |
|   DCL R3 REGISTER(3) RSTD; |
|   DCL B Entry( ) OPTIONS(NOSAVE(3)); |
|   ... |
|   R3 = 1; |
|   Call B; |
|   X = R3; |
| B:PROC OPTIONS(NOSAVE(3)); |
|   Generate Sets(R3) Refs(R3) (AHI R3, 10); |
|   ... |
| END B; |
| END A; |

PL/X allows users to specify which registers to be saved on entry to and restored on exit from the procedure.

RR cannot be relaxed if the RR is set/used globally across procedures (through SAVE/NOSAVE entry options), since we perform register allocation separately for each procedure and thus cannot ensure allocating the same register in multiple procedures for RR if RR is relaxed (see TABLE 2).

A third example, directed to a built-in instruction call (for PL/X only), will now be described with respect to TABLE 3.

TABLE 3

```
DCL R2 REGISTER(2) RSTD;
/* truncation process */
RFY (R2) RSTD;                          ! not necessarily be R2 for SRP
R2 = 64 - xrnd;
SRP (PACKED1, 0(R2), 0);
R2 = xrnd;
SRP (PACKED1, 0(R2), 0);
RFY (R2) UNRSTD;
```

RR cannot be relaxed if the instruction can only take that specific register of the RR (either explicitly or implicitly).

Otherwise, we can free up the restriction on the register usage (see TABLE 3)

Again, we need to check if the instruction has a paired register requirement for use in the register allocation.

An example of the transformation step will now be described with respect to TABLES 4 and 5, in accordance with various embodiment of the present principles. TABLE 4 shows the original program before transformation, and TABLE 5 shows the pseudo program after transformation.

TABLE 4

```
DCL R0 REG(0) UNRSTD PTR(31);
DCL R1 REG(1) UNRSTD PTR(31);
DCL R2 REG(2) UNRSTD PTR(31);
...
RFY (R0,R1,R2) RSTD;
R2 = 1;                            ! Get attempt flag
GEN(NR R2,R2) SETS(R2);            ! Set CC for recovery #1
LWTAATMP = R2;                     ! Attempting CS
R0 = LWTAOLBCE->LBCEUCCS;          ! Get use cnt on curr LBCE
UCCS_CS1:;
R1 = R0 + 1;                       ! Increase buffer use cnt
CS(R0,R1,LWTAOLBCE->LBCEUCCS);     ! = LBCEUCNT+1
BC(7,UCCS_CS1);                    ! Try until success
LWTAUCCS = ON;                     ! Tracking - we set use cnt
LWTAATMP =0;                       ! Done updating use count
RFY (R0, R1, R2) UNRSTD;
```

TABLE 5

```
DCL R0 REG(0) UNRSTD PTR(31);
...
DCL RA PTR(31); ! with allowableRegisterBV
DCL RB PTR(31); !   set all register bits
DCL RC PTR(31); !
RB = 1;
GEN(NR RB,RB) SETS(RB);
LWTAATMP = RB;
RA = LWTAOLBCE->LBCEUCCS;
UCCS_CS1:;
RB = RA + 1;
CS(RA,RB,LWTAOLBCE->LBCEUCCS);
BC(7,UCCS_CS1);
LWTAUCCS = ON;
LWTAATMP = 0;
```

We have three RR variables (R0, R1, R2). In the analysis step, we can identify that none of them need to be restricted at all in the following program regions:

The instruction inside of the GENERATE statement does not require a specific register.

The built-in instruction CS does not require specific registers in its first and second operands.

In the transformation step, we create new symbols RA, RB, and RC by inheriting the same attributes from R0, R1, and R2, respectively, but with allowable register BV set all register bits to indicate that we can allocate any register to these new symbols. This expands the discretion of register allocator when allocating registers for these symbol variables.

We replace R0/R1/R2 in the program region with the newly created symbols, including a GENERATE statement in which we can simply change the text of the assembler code.

RFY statements that define the range of the RR restrictions are actually represented as register locking information in the relevant basic blocks in the compiler IL. We remove register locking of @00, @01, and @02 from these basic blocks to free up the constraints in the register allocation.

The transformation is actually performed in the compiler IL, but is shown at the source level in the example involving TABLES 4 and 5 for the sakes of illustration and understanding.

An example of relaxing user-specified register requirements for improving register allocation based on the C programming language will now be given with respect to TABLES 6 and 7, in accordance with various embodiment of the present principles.

TABLE 6 shows the innermost loop of a string matching function in zlib written in C and TABLE 7 shows its inline assembly code with user specified register constraints.

TABLE 6

```
do {
} while (*++scan == *++match &&
    *++scan == *++match &&
    *++scan == *++match &&
    *++scan == *++match &&
    scan < strend);
```

TABLE 7

```
Byte register *scan asm("edx");    // declare RR variable
Byte register *match asm("ecx");   // ditto
...
__asm__ (
"lbl10:\n\t"          // do {
"movzbl 1(%0), %%eax;"  // scan_byte = *(scan + 1)
"cmp %%al, 1(%1);"      // if (scan_byte == *(match+1))
"jne label1;"           //   break;
"movzbl 2(%0), %%eax;"  // scan_byte = *(scan + 2)
"cmp %%al, 2(%1);"      // if (scan_byte == *(match+2))
"jne label2;"           //   break;
"movzbl 3(%0), %%eax;"  // scan_byte = *(scan + 3)
"cmp %%al, 3(%1);"      // if (scan_byte == *(match+3))
"jne label3;"           //   break;
"movzbl 4(%0), %%eax;"  // scan_byte = *(scan + 4)
"cmp %%al, 4(%1);"      // if (scan_byte == *(match+4))
"lea 4(%0), %0;"        // scan += 4
"lea 4(%1), %1;"        // match += 4
"jne label11;"          //   break;
"cmp %0, %2;"           // (scan < strend)?
"jl label10;"           // while (scan < strend)
"jmp label11;"          // done
"label3:;"
"lea 1(%0), %0;"        // scan += 1
"lea 1(%1), %1;"        // match += 1
"label2:;"
"lea 1(%0), %0;"        // scan += 1
"lea 1(%1), %1;"        // match += 1
"label1:;"
"lea 1(%0), %0;"        // scan += 1
"lea 1(%1), %1;"        // match += 1
"label11:;"
```

TABLE 7-continued

```
: "+r" (scan), "+r" (match)  // both input and output
: "r" (strend)               // input
: "%eax", "cc"               // clobbered registers
);
```

We have two RR variables, namely "scan" and "match" tied to edx and ecx, respectively. After declaration, these variables are tied to specific registers during the entire lifetime of the variable.

The two RR variables are inputs/outputs to the asm block where they are referenced as %0 and %1, respectively. Examining the instructions in the asm block shows that there is actually no register constraint at all for the two RR variables. That is, the compiler can allocate any available register for the two RR variables.

Similarly, the general purpose register eax in the clobbered list shows the working register in the asm block. This is another form of RR. Again examining the instructions in the asm block shows we can use any other registers for this dummy variable.

We can relax the register requirements for all these RRs. The register allocator can then get broader allocation choices for these variables, making less constraints for other variables and less chances of generating spill code.

Another example of relaxing user-specified register requirements for improving register allocation based on the C programming language will now be given with respect to TABLE 8, in accordance with various embodiment of the present principles.

the result is in eax. The inline assembly interface also specifies that edx is to be used as a working register (a dummy variable) in the assembly block. All of these are user-specified RR variables, although they are not tied to specific registers at their declaration point.

Examining instructions in the assembly block shows that input1 (%1 in the instruction sequence) has indeed a register constraint to eax because it is used as a dividend of idiv instruction, while input2 (%2 in the instruction sequence) has no constraint other than eax/edx (which are assumed in idiv instruction). Likewise, the dummy variable (clobbered register edx) has indeed a constraint to that register due to the idiv instruction.

From this result, we can only relax the register requirement on input2 and have to keep the specified register constraint on input1 and the dummy variable in this case.

Since the constraint to input2 is specified in the assembly interface and thus it is in effect only in the assembly block, we do not need to localize the variable. We can just relax the constraint from "b" (ebx) to "r" (any register). This will provide more freedom to the compiler for register allocation and result in less chances of generating code to move values back and forth between registers.

An example of relaxing user-specified register requirements for improving register allocation based on the PL/X programming language will now be given with respect to TABLE 9, in accordance with various embodiment of the present principles.

TABLE 8

```
int input1, input2, result ;
...
/* compute greatest common divisor using Euclid's Algorithm */
__asm__ __volatile__ ( "CONTD: cmpl $0, %2;"
    "je DONE; "
    "xorl %%edx, %%edx;"        // clear register
    "idivl %2;"                  // input1 / input2
    "movl %2, %1;"               // set input2    => input1 (next dividend)
    "movl %%edx, %2;"            // set remainder => input2 (next divisor)
    "jmp CONTD; "
    "DONE: movl %%eax, %0; "    // move eax to output operand (just in case)
    : "=a" (result)              // output operand referred to by register eax
    : "a" (input1), "b" (input2) // input operands referred to by registers eax
                                 // and ebx, respectively
    : "%edx"                     // clobbered registers
);
...
```

In this example, the inline assembly interface specifies that input1 and input2 are in eax and ebx, respectively, and

TABLE 9

| | |
|---|---|
| DCL R14 REG(14) UNRSTD PTR(31); (initially unrestricted) | // declare restricted register variable |
| DCL R15 REG(15) UNRSTD PTR(31); | // ditto |
| DCL REGX REG(*) PTR(64); | // declare designated register variable |
| DCL REGY REG(*) PTR(64); | // ditto |
| ... | |
| RFY (R14,R15) RSTD; | // re-specify R14 and R15 as restricted ( entry of restrict region) |
| REGX = Addr(HashGenVal); | // get result addr into REGX variable |
| REGY = Addr(HASHVAL); | // get input addr into REGY variable |
| GENERATE REFS(FPFACTOR, REGY, REGX, HASHMASK) SETS(R14,R15); // inlined assembler code block | |
| L   R15,0(REGY) | // get input string |
| M   R14,FPFACTOR | // multiply R15 and constant, result in R15/R14 |
| XR  R15,R14 | // xor result into 32 bits |

TABLE 9-continued

| | |
|---|---|
| L R14,HASHMASK | // load mask |
| NR R15,R14 | // turn off high bit |
| ST R15,0(REGX) | // store the hash result |
| @ENDGEN; | |
| RFY (R14,R15) UNRSTD; | // free restricted registers |

In this example, R14 and R15 are declared as RR variables (initially unrestricted), and REGX and REGY are declared as DR variables.

The restriction and unrestriction of RR variables are controlled by RESPECIFY (or RFY) statement. In the program region where R14 and R15 are restricted, programmers take complete responsibility for management of RR and these registers are made unavailable to the compiler.

We can see that the two RR variables are just used as working registers inside of inline assembly (GENERATE statement) and not necessarily be registers of @ 14 and @15, respectively. The only register requirement is that the two RR variables to be an even-odd register pair (since R14 is used as an operand of instruction M).

Similarly, the two DR variables need not be restricted at all. They can be allocated to any register in this code region, including @00, @01, and @13-@15.

By localizing all of these RR/DR variables and relaxing their register requirements, the register allocator gets broader choices for these variables, making less constraints for other variables depending on the context and producing better code.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for relaxing register constraints in a computer program, the method comprising:
   identifying, by a processor enabled compiler, unrequired register constraints imposed by a user on the computer program, the unrequired register constraints being unrequired for a proper operation of the computer program; and
   automatically relaxing, by the processor enabled compiler, the identified unrequired register constraints to optimize register allocation for the computer program,
   wherein said identifying step comprises parsing and analyzing live range intervals of at least one of restricted register variables and designated register variables to identify an occurrence of one or more pre-specified conditions indicating a lack of potential for register constraint relaxation therefor, and
   wherein the one or more pre-specified conditions include a use of a given restricted register variable or a given designated register variable across two or more procedures.

2. The method of claim 1, wherein an analysis of the at least one of the restricted register variables and the designated register variables is constrained in the live range intervals.

3. The method of claim 1, wherein the one or more pre-specified conditions include an instruction that can only take a specific register from among a plurality of potentially available registers.

4. The method of claim 1, wherein said identifying step further comprises parsing and analyzing instruction sequences inside one or more inline assembler code blocks in the computer program to identify an occurrence of one or more pre-specified conditions indicating a lack of potential for relaxation of a given register constraint.

5. The method of claim 4, wherein the one or more pre-specified conditions include at least one of a macro call to another procedure, a jump to another procedure, and a branch to another procedure.

6. The method of claim 4, further comprising preserving the given register constraint responsive to the existence of the one or more pre-specified conditions.

7. The method of claim 4, wherein the one or more pre-specified conditions include an existence of an assembler macro having an unknown register interface, and the method further comprises invoking an assembler for code expansion responsive to encountering the assembler macro having the unknown register interface.

8. The method of claim 1, wherein said identifying step comprises:
   computing a set of required register constraints for a virtual register variable from specifications of individual instructions in one or more inline assembler blocks in the computer program; and
   comparing the set of required register constraints against user imposed register constraints for the virtual register variable to identify an existence of differences there between.

9. The method of claim 8, further comprising providing a warning message to the user that a current register specification for the virtual register variable is too restrictive and suggesting one or more less restrictive register specifications for the virtual register variable, responsive to the existence of the differences.

10. The method of claim 8, automatically relaxing the unrequired register constraints imposed by the user on the virtual register variable, responsive to the existence of the differences.

11. A computer program product for relaxing register constraints in a computer program, the computer program product comprising a non-transitory computer readable storage medium having program instructions embodied therewith, the program instructions being executable by a computer to cause the computer to perform a method comprising:
- identifying, by a processor enabled compiler, unrequired register constraints imposed by a user on the computer program, the unrequired register constraints being unrequired for a proper operation of the computer program; and
- automatically relaxing, by the processor enabled compiler, the identified unrequired register constraints to optimize register allocation for the computer program,
- wherein said identifying step comprises parsing and analyzing live range intervals of at least one of restricted register variables and designated register variables to identify an occurrence of one or more pre-specified conditions indicating a lack of potential for register constraint relaxation therefor, and
- wherein the one or more pre-specified conditions include a use of a given restricted register variable or a given designated register variable across two or more procedures.

12. The computer program product of claim 11, wherein an analysis of the at least one of the restricted register variables and the designated register variables is constrained in the live range intervals.

13. The computer program product of claim 11, wherein the one or more pre-specified conditions include an instruction that can only take a specific register from among a plurality of potentially available registers.

14. The computer program product of claim 11, wherein said identifying step further comprises parsing and analyzing instruction sequences inside one or more inline assembler code blocks in the computer program to identify an occurrence of one or more pre-specified conditions indicating a lack of potential for relaxation of a given register constraint.

15. The computer program product of claim 14, wherein the one or more pre-specified conditions include at least one of a macro call to another procedure, a jump to another procedure, and a branch to another procedure.

16. The computer program product of claim 14, further comprising preserving the given register constraint responsive to the existence of the one or more pre-specified conditions.

* * * * *